Figure 1:
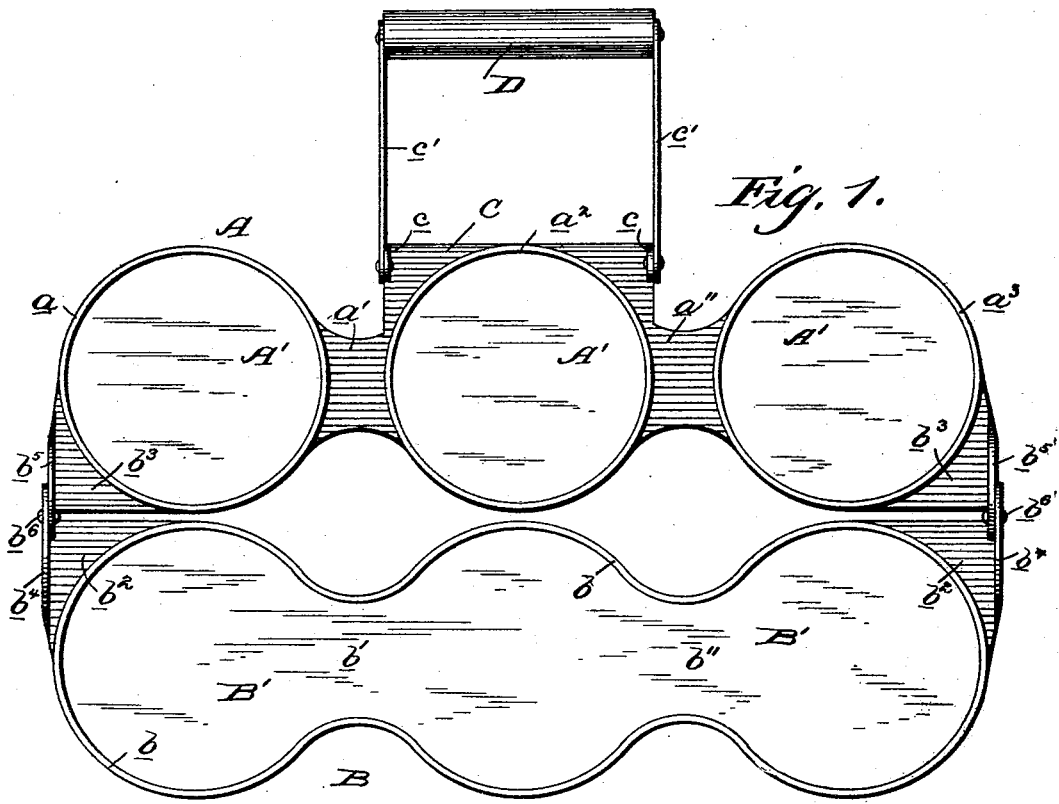

No. 684,441. Patented Oct. 15, 1901.
H. B. LAWTON.
GRIDDLE.
(Application filed Jan. 11, 1901.)
(No Model.)

WITNESSES:

INVENTOR:
Henry B. Lawton,
BY
Milo B. Stevens & Co.,
ATTORNEYS.

UNITED STATES PATENT OFFICE.

HENRY B. LAWTON, OF MORRISON, ILLINOIS.

GRIDDLE.

SPECIFICATION forming part of Letters Patent No. 684,441, dated October 15, 1901.

Application filed January 11, 1901. Serial No. 42,896. (No model.)

*To all whom it may concern:*

Be it known that I, HENRY B. LAWTON, a citizen of the United States, residing at Morrison, in the county of Whiteside and State of Illinois, have invented certain new and useful Improvements in Griddles; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to an improvement in griddles, and has for its primary object the provision of a griddle comprising two members pivotally secured together, the one intended for use in forming the cake and baking the same on one side, and the other intended to receive the cake reversed for baking on the opposite side.

The invention also contemplates the provision of a handle for operating one of the members of the griddle relative to the other and in means on the handle for retaining the same at all times in elevated position ready to be grasped by the user.

The invention further has for its object the peculiar construction and connection of the two members, as will more fully appear from the specification hereinafter and the appended claim.

In the accompanying drawings, forming part hereof, an embodiment of the invention is shown for the sake of clearness in understanding the same, and when hereinafter referring to the same like reference characters will refer to corresponding parts in both views.

Figure 2:
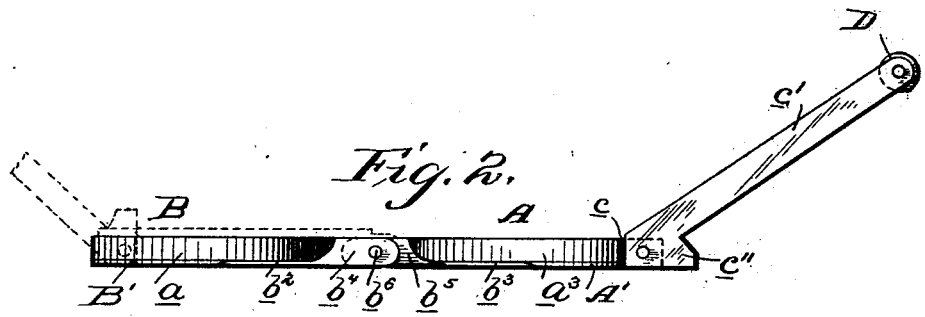

In the drawings, Figure 1 is a plan view of the griddle as it appears in operative position; and Fig. 2 is a side elevation of the same, parts being broken away to facilitate the illustration of the handle.

Referring more specifically to the drawings, A and B designate, respectively, the two members of a griddle hinged together in a manner to be referred to. The member A comprises a continuous flat sheet-metal base A', adapted to rest upon a stove-top or other heater. Equidistant upon the upper surface of this base are secured a series of circular flanges $a, a^2$, and $a^3$, connected by the portions $a'\ a''$ of the base. The member B comprises a flat sheet-metal base B', corresponding to the base A', and a flange $b$, secured to the upper surface thereof. The flange $b$ is in contour such as to permit of the reception of the flanges on the member A' and connecting-pieces $a'\ a''$, for a purpose which will hereinafter appear. The respective base-plates have continuations $b^2\ b^3$ at their adjacent inner ends, the extreme ends of which are respectively bent up to form the ears $b^4\ b^5$, in turn connected by the pivot-bolts $b^6$.

As stated, when in use the two members of the griddle are in open position and lie flat upon the heater. The flanges on the member A' form cups or receptacles into which the cake-batter is placed in the first instance and baked upon the one side. The circular flanges being continuous will give the cake the proper shape and confine the batter from spreading until it is cooked upon one side sufficiently to hold together. At this stage it is desirable to reverse the cake and throw the same from the cups into the member B. For this purpose the base-plate A' is extended outward slightly, as at C, and is provided with the upturned ears $c$, to which are pivoted connecting-links $c'$, supporting at their outer ends a wooden or other handle D. Through the medium of this handle the member A may be swung over into the member B (dotted lines, Fig. 2) and the cakes reversed. By reason of the peculiar formation of the flange $b$ spaces $b'\ b''$ are left unobstructed, so that when the cakes are thoroughly baked an ordinary cake-turner or other implement may be readily inserted therebeneath and the cakes removed. By the use of this griddle cakes may be forming and cooking upon one side in the member A, while at the same time others may be browning or baking upon the opposite side, as will be readily apparent.

To retain the handle in elevated position at all times ready to be grasped by the user, I provide at the lower ends of the links $c'$ outwardly-extending shoes or projections $c^2$, designed to rest in the plane of the bottom of the griddle and prevent the handle from falling in an obvious manner.

Of course the configuration of the forming-cups may be altered and other changes made in the details and constructions of the several parts without in the least departing from the spirit of the invention.

Having thus described the invention, what is claimed as new, and desired to be secured by Letters Patent, is—

In a device of substantially the character described, the combination with oppositely-disposed members, extended portions $b^2$, $b^3$, extending outwardly at substantially the plane of the ends of the members, ears $b^4$, $b^5$, on said extended portions, pivot-bolts passing therethrough, and uniting the two members, and means for turning one of the members over into the other, comprising projecting ears thereon, a handle, links pivotally connecting the handle to the ears, and shoes on the links projecting rearwardly from their pivotal points to constitute extended horizontally-disposed bearing-surfaces, substantially as and for the purpose described.

In testimony whereof I affix my signature in presence of two witnesses.

HENRY B. LAWTON.

Witnesses:
A. R. BAIRD,
F. M. THOMAS.